Patented June 18, 1935

2,005,645

UNITED STATES PATENT OFFICE 2,005,645

PROCESS OF OXIDIZING ALIPHATIC ALCOHOLS TO ALDEHYDES

Harlan A. Bond, Metuchen, and Lee B. Smith, Woodbridge, N. J., assignors, by mesne assignments, to E. I. du Pont de Nemours and Company, a corporation of Delaware No Drawing. Application April 15, 1930, Serial No. 444,602

11 Claims. (Cl. 260—138)

This invention relates to processes for the production of aliphatic aldehydes from mixtures of the corresponding alcohol and oxygen containing gases in the presence of a catalyst.

The catalysts here employed are especially applicable to the oxidation of lower members of the aliphatic alcohol series such as methanol, ethanol, butanol and the like. It will be understood that conditions hereinafter referred to such as temperature, space velocity and the alcohol-oxygen containing gas ratio will be subject to the usual experimental variation which one familiar with this art ordinarily finds necessary in proceeding from member to member of a series of organic compounds. Moreover said catalyst bodies will not function at temperatures so extreme that sintering, fusing or other like injuries result. Nor are they applicable if poisoned, corroded or enveloped by solid deposits of an inactive material such as carbon.

The preparation and properties of these catalysts will now be specifically described and their use illustrated in terms of the oxidation of methanol to formaldehyde with air. It will be understood, however, that this specific illustrative means will not limit the scope of this invention.

One catalyst material of this invention consists of stable aggregates of a particularly compact and porous form of silver obtained when silver oxide or other decomposable silver compound is compressed to a compact mass and decomposed by heat in an atmosphere of reducing gases or inert gases. This material we shall hereafter call porous compacted silver.

This material may be conveniently produced as illustrated below:

*Preparation A.—Porous pilled silver*

Silver oxide obtained by adding sodium hydroxide to silver nitrate is washed several times by decantation with hot water and then thoroughly washed on a vacuum filter. 2 grams of citric acid or other suitable organic binder dissolved in a few cc. of water is added to the moist cake, which is then dried at about 150° C.

The dry reducible silver composition is ground to pass a 20 mesh sieve and then placed in a standard pilling machine and compressed into compact form. The pills are crushed to an 8 to 20 mesh size and are reduced for several hours, by non-poisoning gases, such as a mixture of hydrogen and methanol vapor. During the reduction, the temperature is increased very slowly to about 500° C., after which the mass is allowed to cool in an atmosphere of hydrogen. By this process, a compact, granular, self-sustaining and very porous form of reduced silver is obtained, which has high heat conductivity and is most suitable for carrying out catalytic reactions involving contacting gases with the catalyst.

The catalyst may be reduced in pilled form without crushing and so employed. Reduction is more difficult, however, and a bed of such pills is not such a good heat conductor nor does it pack as free from channeling as the crushed pilled material does.

The preferred method given in the above example can be varied considerably without essentially departing from the properties of the product obtained by this invention. It is possible to employ other binders than citric acid, e. g. stearic acid, sugar, glue or even silicates provided the binder is volatile and/or destructible, or is added in such small quantity that the surface of the silver remained substantially uncovered after compacting and reducing. The silver can also be produced by the application of heat alone at any temperatures sufficiently high to decompose the silver compound and not high enough to fuse or sinter the silver. The reducing gases can then be replaced by nitrogen or other inert gases. The inert gases will not combine with the decomposition products but will displace them and prevent recombination with the silver and hence are equivalent to reducing gases in effect. The term "reduced silver" hereafter employed is intended to cover silver prepared by all modifications herein described. The silver will be allowed to cool in an inert atmosphere in order to prevent surface oxidation.

The invention has been described in terms of silver oxide but it is evident that any decomposable and/or reducible silver compounds such as silver oxalate, carbonate and the like which do not leave objectionable residues in the metallic silver formed may replace the oxide. Accordingly the term "reducible silver compound" used in the appended claims refers to silver oxide, silver oxalate, silver carbonate or other silver compounds which do not leave an objectionable residue in the metallic silver upon reduction or decomposition.

The binder may be omitted in case the material possesses per se the necessary adhesive qualities to give a firm, compact mass which does not crumble and disintegrate on drying, decomposing and/or reducing. Other means may also replace the pilling machine so long as thoroughly compacted bodies are produced.

Other variants of this invention consist of silver of the character previously called porous compacted silver, with a small amount of an oxide of tungsten, vanadium, cerium, thorium, aluminum, chromium, zinc, molybdenum, or similar metal as a promoter. These oxides are characterized as dehydrogenating and are themselves substantially non-reducible under the conditions of the reaction. The metallic oxide should be present in small amounts, not more than about 10% by weight of the catalyst and preferably less than about 1%.

All the variations of our catalyst material possess superior qualities. They are selective catalysts in that they have only a slight tendency to cause the formation of by-products. They possess excellent thermal conductivity, a material advantage in case of exothermic oxidations with which this invention is concerned because heat must be removed. They are stable at the temperatures reasonably below the melting point of silver, e. g. they do not readily fuse or sinter at these temperatures nor tend to disintegrate within reasonable time of usage into a fine powder with stoppage of gas flow.

It will be appreciated that simple or promoted catalysts according to this invention may be prepared in many ways, as long as the silver is of a porous, compact nature and firmly retains the metal oxide promoter.

Methods of preparing the promoted variety of this catalyst may be roughly grouped as follows:

1. Porous compacted silver prepared as already described is impregnated with material giving the promoting oxide.
2. Suitable silver compounds are mechanically mixed with suitable promoter compounds. The mixture is compressed and the silver compound reduced while the promoting oxide remains or is formed by decomposition in situ.
3. Solutions of suitable silver compounds are mixed with solutions of a salt or salts which would form the desired promoter. The insoluble silver salt and promoting material are then coprecipitated from this mixed solution. The precipitate, for example, the mixed oxides is filtered, washed, dried, compacted and the silver reduced as described. The promoting compound can be added at practically any stage of the preparation of the Ag catalyst. The following will illustrate some methods of preparing our promoted catalysts.

*Preperation B (impregnation).—Silver-vanadium oxide*

3 grams of ammonium vanadate is treated with 1.8 cc. of concentrated $HNO_3$ and diluted with water to 100 cc. The vanadium oxide thus formed is washed by decantation several times and stirred thoroughly with 100 cc. of hot water. Part of the $V_2O_5$ is soluble and a part remains in suspension. After the major portion of the suspension has settled, the liquor containing the remaining $V_2O_5$ is poured over porous compacted silver of a size from 4–20 mesh made as previously described and placed on a filter. Vacuum and pressure are alternately applied to introduce the vanadium oxide within the pores of the silver. The excess liquor is drained off, the silver placed in an oven at 80° C., the temperature of which is then raised slowly to 110° C., and the mass left to dry at this temperature until its weight becomes constant. The catalyst material thus produced consists of compact, strong, granulated, porous silver particles containing about 0.03% by weight of $V_2O_5$.

It may be that under the high temperature at which the reaction takes place some silver vanadate is formed during the course of the reaction. The catalyst body is therefore characterized as a strong, compact, porous mass of silver impregnated with a relatively much smaller quantity of combined and/or adhering vanadium oxide.

*Preparation C (coprecipitation).—Silver-ceria*

1.25 g. of cerium nitrate dissolved in 100 cc. water is added to a liter of silver nitrate solution containing 125 g. of silver. 2N. sodium hydroxide solution is added to the silver-ceria mixture until a precipitate starts to form and an extra 48 grams of sodium hydroxide dissolved in 1000 cc. of water then added, which precipitates together the silver and cerium oxides. The precipitate is washed free from nitrates and alkali and 2 grams of citric acid is added to the moist filter cake. The precipitate is dried at 150° C., ground to pass a 20 mesh sieve and compressed into compact form with a pilling or tablet machine. The masses thus produced are broken to such a size as will pass an 8 mesh sieve and be retained on a 20 mesh sieve and are placed in such form in the reaction chamber where they will finally be employed as catalysts. Reduction can thus be carried out in situ and the reactants, for example a 1.5 to 1 mixture of air and methanol vapor, themselves serve as reducing gases.

*Preparation D (mixing).—Silver tungsten oxide*

0.5 grams of tungsten oxide is dissolved in a small amount of 2N. sodium hydroxide solution, diluted to 100 cc. and made decidedly acid with $HNO_3$. The tungsten oxide thus precipitated is washed and added to the flask containing a suspension of about 130 grams of purified silver oxide in about 800 cc. of $H_2O$. The mixture is rapidly agitated to secure intimate mixing of the oxides and then allowed to settle leaving a clear supernatant liquor. The precipitate is filtered, washed thoroughly and thereafter treated in the manner described in the second paragraph of Preparation A. The catalyst material thus produced consists of reduced compact, stable, granulated, porous silver aggregates containing about ¼% by weight of tungsten oxide.

*Preperation E (impregnation).—Silver-tungsten oxide*

The porous compacted silver of Preparation A may also be promoted with tungsten oxide as follows:

0.5 g. of tungsten oxide is dissolved in 75 cc. of $NH_4OH$ and the ammonia boiled off while the volume is kept up by additions of $H_2O$. The solution of ammonium tungstate thus obtained was poured over the compacted silver; vacuum and pressure are alternately applied to impregnate the pores of the silver. The excess liquor is drained off, the silver placed in an oven at 80° C., the oven temperature then raised slowly to 110°

C., and the mass left to dry to constant weight. The material, after grinding and sieving is similar to that of Preparation D.

Porous pilled silver of this invention by reason of its high conductivity, porosity, and physical stability will not only serve as a simple or promoted catalyst but is also useful as a carrying base. It will be suitable for any reactions not adversely affected by silver and the products and conditions of which do not attack or destroy the large surface. The catalyst may be deposited on the pilled silver in any suitable fashion.

The following examples are given to further illustrate use of the catalysts of the invention. Loosely packed beds of catalyst resting on the bottom of a reaction chamber and of a thickness from about ½ to several inches have given good results. In general, the arrangement and dimensions of the catalyst bed should permit a close control of temperature within the catalyst, and will vary considerably with the type and size of apparatus employed. Temperatures of from about 500 to 750° C. have been found optimal in converting methanol of formaldehyde. The conditions specified should not be considered as limiting the invention, however, inasmuch as they may be varied considerably and still produce good results.

In these examples the term "overall yields" denotes the percentage of methanol, passed into the reaction vessel, that is actually converted to formaldehyde. The theoretical yield is the percentage obtained by comparing the formaldehyde produced with the equivalent of the methanol which has actually been used up during the reaction, said methanol used up being determined by subtracting the methanol appearing in the final product from the total methanol that entered the reaction vessel.

a reducible silver compound formed without an inert diluent or carrier and promoted with a small amount of an oxide of a metal selected from the group consisting of vanadium, tungsten, cerium, thorium, aluminum, chromium, zinc and molybdenum.

4. A process for producing an aliphatic aldehyde comprising reacting a mixture of a lower aliphatic alcohol and a molecular oxygen containing gas in the presence of porous, compacted reduced silver produced by reducing a compact body of silver oxide without an inert diluent or carrier and promoted with up to about 1% by weight of a dehydrogenating oxide of a metal substantially non-reducible under the conditions of the reaction.

5. A process for the production of formaldehyde comprising reacting a mixture of methanol and a molecular oxygen containing gas in the presence of porous, compacted silver as a catalyst produced by forming a compact body of silver oxide without an inert diluent or carrier and reducing the mass to metallic silver.

6. A process for the production of formaldehyde comprising reacting a mixture of methanol and a molecular oxygen containing gas at about 500 to 750° C., in the presence of porous, compacted silver as a catalyst produced by forming a compact body of silver oxide without an inert diluent or carrier and reducing the mass to metallic silver.

7. In a process for producing formaldehyde from methanol and molecular oxygen containing gases at elevated temperatures the step of using a catalyst comprising compacted, porous reduced silver obtained by reducing formed bodies of silver oxide impregnated with an organic binder.

8. A process for the preparation of formalde-

| Catalyst composition | Temperature | Air-methanol ratio | Space velocity per hr. | Over-all yield formaldehyde | Theoretical yield formaldehyde |
|---|---|---|---|---|---|
| | | | | Percent | Percent |
| Rich methanol mixtures | | | | | |
| (1) Silver (Prep. A) | 500–700° C. | 1.5:1 | 40,000 | 73 | 90 |
| (2) Silver-tungsten oxide (Prep. D) | 500–700° C. | 1.5:1 | 40,000 | 71 | 94 |
| Lean methanol mixtures | | | | | |
| (3) Silver (Prep. A) | 500–700° C. | 2:1 | 25,000 | 74 | 87 |
| (4) Silver vanadium oxide (Prep. B) | 500–700° C. | 2:1 | 37,000 | 77 | 89 |
| (5) Silver-ceria (Prep. C) | 500–700° C. | 2:1 | 24,000 | 74 | 88 |
| (6) Silver-tungsten oxide (Prep. D) | 500–700° C. | 2:1 | 40,000 | 76 | 93 |
| (7) Silver-tungsten oxide (Prep. E) | 500–700° C. | 2:1 | 37,000 | 81 | 90 |
| (8) Silver-tungsten oxide (Prep. E) | 500–700° C. | 2:1 | 49,000 | 81 | 91 |

We claim:

1. A process for producing an aliphatic aldehyde comprising reacting a mixture of a lower aliphatic alcohol and a molecular oxygen containing gas in the presence of porous, compacted, reduced silver as a catalyst produced by forming a compact body of silver oxide without an inert diluent or carrier and reducing the mass to metallic silver.

2. A process for producing an aliphatic aldehyde comprising reacting a mixture of a lower aliphatic alcohol and a molecular oxygen containing gas in the presence of porous, compacted, reduced silver produced by reducing a compact body of silver oxide without an inert diluent or carrier and promoted with a small amount of a dehydrogenating oxide of a metal substantially non-reducible under the conditions of the reaction.

3. The process for producing an aliphatic aldehyde comprising reacting a mixture of a lower aliphatic alcohol and a molecular oxygen-containing gas in the presence of porous compacted silver produced by reducing a compact body of hyde comprising reacting a mixture of methanol and a molecular oxygen containing gas at about 500 to about 750° C. in the presence of silver promoted by a small amount of a dehydrogenating oxide of a metal substantially non-reducible under the conditions of the reaction as a catalyst.

9. The process for the preparation of formaldehyde comprising reacting a mixture of methanol and an oxygen-containing gas in the presence of compacted porous silver produced by decomposing a compact body of a reducible silver compound formed without an inert diluent or carrier, said catalyst carrying a small amount of an oxide of a metal selected from a group consisting of tungsten, vanadium, cerium, thorium, aluminum, chromium, zinc and molybdenum.

10. A process for the preparation of formaldehyde comprising reacting a mixture of methanol and a molecular oxygen containing gas, in the presence of compacted, porous, reduced silver produced by reducing a compact body of silver oxide without an inert diluent or carrier and carrying up to about 10% of an oxide of a metal from the group consisting of tungsten, vanadium, cerium, thorium, aluminum, chromium, zinc and molybdenum.

11. A process for the preparation of formaldehyde comprising reacting a mixture of methanol and a molecular oxygen containing gas in the presence of compacted porous reduced, silver produced by reducing a compact body of silver oxide without an inert diluent or carrier and carrying up to about 1% of an oxide of a metal from the group consisting of tungsten, vanadium, cerium, thorium, aluminum, chromium, zinc and molybdenum.

HARLAN A. BOND.
LEE B. SMITH.